No. 627,066. Patented June 13, 1899.
J. SCHNEPF.
AUTOMOBILE.
(Application filed May 6, 1898.)
(No Model.) 2 Sheets—Sheet 1.
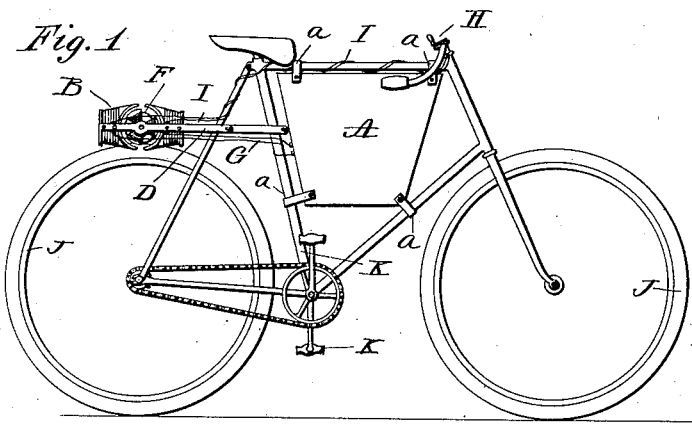
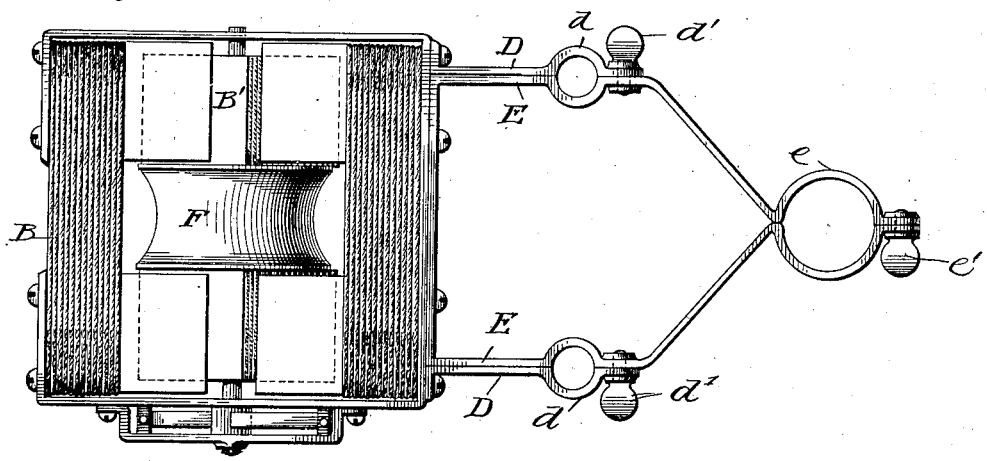
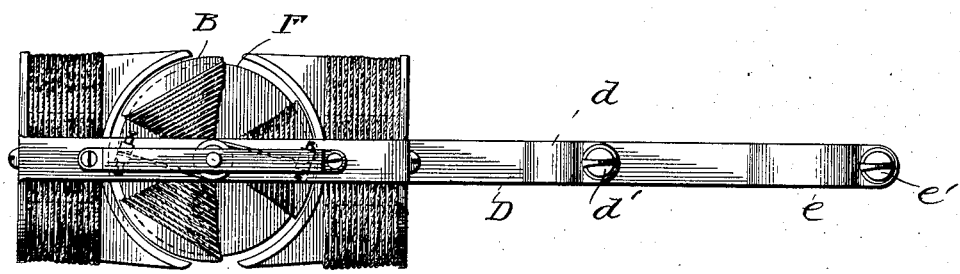
Witnesses:
Inventor No. 627,066. Patented June 13, 1899.
J. SCHNEPF.
AUTOMOBILE.
(Application filed May 6, 1898.)
(No Model.) 2 Sheets—Sheet 2.
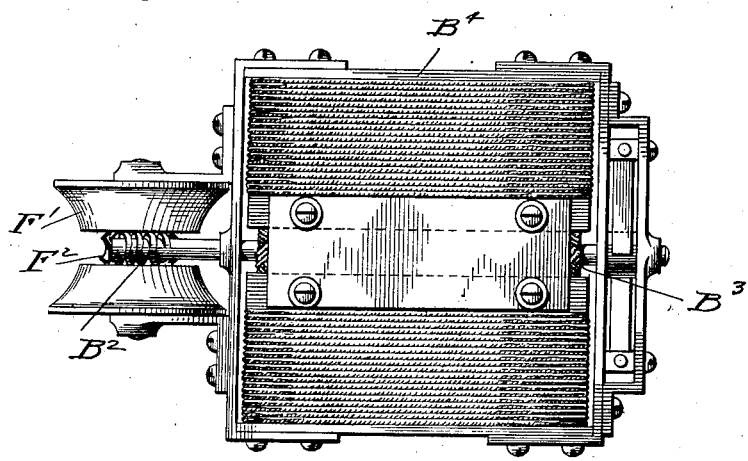
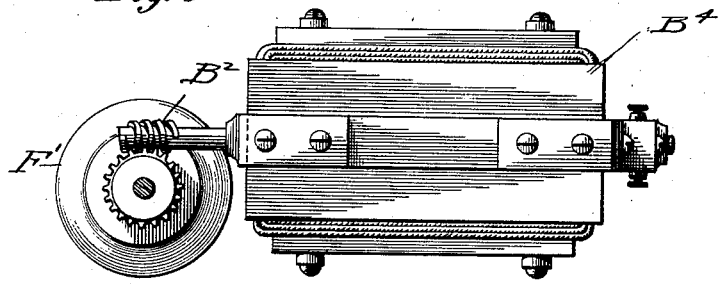
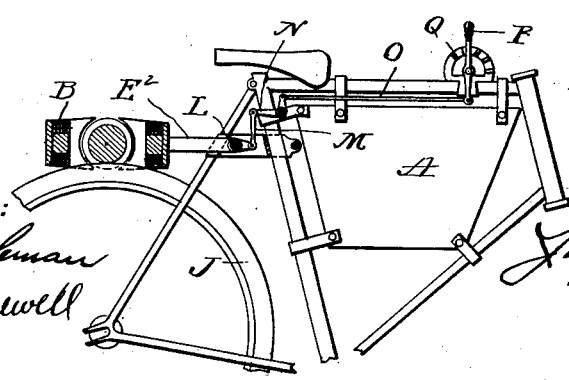
Witnesses:
Inventor
John Schnepf.
Atty

UNITED STATES PATENT OFFICE.

JOHN SCHNEPF, OF NEW YORK, N. Y., ASSIGNOR OF ONE-HALF TO WILLIAM C. DOSCHER, OF SAME PLACE.

AUTOMOBILE.

SPECIFICATION forming part of Letters Patent No. 627,066, dated June 13, 1899.

Application filed May 6, 1898. Serial No. 679,905. (No model.)

*To all whom it may concern:*

Be it known that I, JOHN SCHNEPF, a citizen of the United States, residing at New York, New York county, New York State, have invented certain new and useful Improvements in Automobiles, of which the following is a full, clear, and exact description.

My invention relates to improvements in bicycles and the like; and it consists in the novel construction and arrangement of the parts thereof hereinafter fully described.

The chief object of my invention is to provide a means which may be attached to or detached from a bicycle of any ordinary type, which means may be utilized as a primary or auxiliary driving means.

In the drawings, Figure 1 is a side elevation of a bicycle provided with my improved apparatus. Fig. 2 is a relatively-enlarged plan view of a detailed portion of my invention. Fig. 3 is a side elevation of Fig. 2. Fig. 4 is a plan view of a modification of the detailed portion shown in Fig. 2; and Fig. 5 is a side elevation of parts shown in Fig. 4. Fig. 6 is a side elevation of an apparatus designed to effect an adjustment of the parts hereinafter described.

A is a battery of any suitable portable type. This battery is detachably supported in the forward inside portion of the frame of a bicycle by suitable fastening-clamps *a a a*.

B is a motor. The motor B is mounted in a suitable frame carrying forwardly-projecting arms D D, having semicircular depressions *d d* near their outer ends.

E is a frame a portion of which lies parallel and close to the arms D. The frame E projects beyond the ends of the arms D and is then turned inwardly and again bent toward its extreme forward end into a circle *e*. This circle is divided, so that the forward ends of the frame E may be sprung apart. A wing-nut or other suitable fastening device *e'* is provided to clamp the said divided ends of the frame E near its forward end. Wing-nuts *d'* may be provided near the free ends of the frame D to draw the said frames D toward the frame E.

In Figs. 1, 2, and 3, F is a pulley, preferably grooved and carried by the armature B' of the motor B, said pulley being arranged so as to rotate therewith. Suitable electrical connections G between the battery A and the motor B are provided. Likewise a suitable controlling means H is connected, as at I, with the circuit to regulate the flow of electricity through the motor. This controlling means is provided with a suitable detachable fastening, so that the same may be detachably secured to the frame of the bicycle at any suitable point.

From the above it is apparent that all of the parts heretofore described may be readily attached to or detached from the frame of an ordinary bicycle.

In assembling, battery A is secured to the bicycle-frame. The motor B, through the medium of the frame E and D, may be clamped to the bicycle-frame so as to cause the pulley F to bear upon one of the bicycle-wheels J, preferably the rear or driving wheel. The controlling means H is then clamped to the handle or to any other suitable portion of the frame which is readily available to the rider. The connections G and H may then be made. When the parts are thus attached, the rider may at will allow the current to pass through the motor, energizing the magnets and rotating the armature in the usual way. The rotating armature B' causes the pulley F to rotate, and the same, bearing frictionally upon the driving-wheel J, drives the latter.

Because the pulley F and the wheel J are relatively small and great no great amount of power is required to revolve the armature, the same being determined by the relative sizes of the said pulley and wheel. As the motor has a capacity of very high speed, a sufficiently high speed may be transmitted to the driving-wheel J.

The rider may readily employ the aforesaid driving means as the sole source of power, or, if desirable, it may be employed as the supplemental power, the pedals K K being at all times available to the rider for use. This is true inasmuch as the above apparatus requires no modification of the ordinary bicycle. When the rider encounters a decline, the motor may be thrown into contact with the driving-wheel J and utilized as a dynamo to restore the battery A. It will be understood, of course, that the battery is usually charged from an outside source.

From the above it will be seen that this invention possesses the following advantages: It may be used with any form of bicycle. It may be thrown into or out of action at the will of the rider. It may be used as the sole or supplemental driving power. Very little power is required in driving the same, because the power is applied at the periphery of the wheel only.

In the modification shown in Figs. 4 and 5 I employ a friction-pulley F', provided at any suitable point with a gear $F^2$, adapted to intermesh with a worm-gear $B^2$, which in turn is rotated by the armature $B^3$ of the motor $B^4$.

It should be understood that I contemplate that other modifications and changes in the specific form and arrangement of the parts herein shown may be made without departing from the spirit of my invention so long as it embodies the characteristic features hereinbefore set forth of being capable of being attached to or detached from the frame of an ordinary bicycle and of being so arranged that the driving of the bicycle-wheel is effected by a frictional engagement of a suitable pulley upon the periphery of said bicycle-wheel.

Referring to Fig. 6, one method will be seen by which I effect the desired degree of pressure or contact between the friction-wheel and the vehicle-wheel. In this figure, L is a pivot upon which is hinged the motor-carrying frame $E^2$. To one side of the pivotal connection may be attached to said frame a link M, which is also connected to a bell-crank lever N. O is another link connecting said bell-crank lever N with a lever P, which may be provided with a suitable handle carrying a tooth to engage with a rack Q. The rack Q may be notched, so as to permit the lever P to be locked in any desired position.

When it is not desired to utilize the motor as a driving means, the same may be readily elevated out of engagement with the vehicle-wheel by means of the system of levers and links last described. It is obvious that without departing from the spirit of my invention this said means for elevating the motor may be readily modified or changed. This system of levers also permits of varying the degree of pressure between the friction and vehicle wheels.

What I claim is—

1. In a device of the character described in combination a vehicle having a frame and a front and rear wheel, a support attached to said frame and extending over said rear wheel, a motor carried by said support having a pulley driven by said motor and frictionally engaging said rear wheel, means forming a part of said support whereby the same and said motor may be vertically adjusted so as to press said pulley firmly against said wheel, said motor located at one side of the point of attachment of said support to said vehicle and automatically bearing its weight, when said pulley is pressed against said wheel, upon said pulley to increase the friction between it and said wheel.

2. In a device of the character described in combination an electric motor, a pulley driven by said motor, a frame, extending from said motor and adapted for attachment to the seat-post and rear tubes of a diamond-frame bicycle, having an attaching means toward the end thereof away from said motor and two means of attachment between said motor and said forward means, each laterally separated from said forward attaching means.

Signed at New York, N. Y., this 2d day of May, 1898.

JOHN SCHNEPF.

Witnesses:
R. C. MITCHELL,
WM. C. DOSCHER.